United States Patent
Wang et al.

(10) Patent No.: US 12,314,179 B2
(45) Date of Patent: May 27, 2025

(54) SYSTEM PERFORMANCE MANAGEMENT USING PRIORITIZED COMPUTE UNITS

(71) Applicant: Advanced Micro Devices, Inc., Santa Clara, CA (US)

(72) Inventors: Zhe Wang, Hillsboro, OR (US); Sooraj Puthoor, Austin, TX (US); Bradford M. Beckmann, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/556,348

(22) Filed: Dec. 20, 2021

(65) Prior Publication Data

US 2022/0114097 A1  Apr. 14, 2022

Related U.S. Application Data

(63) Continuation of application No. 14/755,401, filed on Jun. 30, 2015, now Pat. No. 11,204,871.

(51) Int. Cl.
*G06F 12/00* (2006.01)
*G06F 12/084* (2016.01)

(52) U.S. Cl.
CPC .... *G06F 12/084* (2013.01); *G06F 2212/1021* (2013.01)

(58) Field of Classification Search
CPC ............. G06F 12/084; G06F 2212/1021
See application file for complete search history.

(56) References Cited

U.S. PATENT DOCUMENTS

| | | |
|---|---|---|
| 6,112,265 A | 8/2000 | Harriman |
| 7,380,038 B2 | 5/2008 | Gray |
| 8,881,161 B1 | 11/2014 | Chudgar et al. |
| 8,996,818 B2 | 3/2015 | Sim et al. |
| 9,317,331 B1* | 4/2016 | Koh ................. G06F 9/5066 |
| 2002/0062427 A1 | 5/2002 | Chauvel et al. |
| 2004/0117790 A1 | 6/2004 | Rhine |
| 2006/0112227 A1 | 5/2006 | Hady et al. |
| 2008/0235457 A1 | 9/2008 | Hasenplaugh et al. |

(Continued)

OTHER PUBLICATIONS

Mekkat, V., Holey, A., Yew, P. C., & Zhai, A. (Oct. 2013). Managing shared last-level cache in a heterogeneous multicore processor. In Proceedings of the 22nd international conference on Parallel architectures and compilation techniques (pp. 225-234). IEEE Press. (Year: 2013).*

(Continued)

*Primary Examiner* — Daniel D Tsui
(74) *Attorney, Agent, or Firm* — Volpe Koenig

(57) ABSTRACT

Methods, devices, and systems for managing performance of a processor having multiple compute units. An effective number of the multiple compute units may be determined to designate as having priority. On a condition that the effective number is nonzero, the effective number of the multiple compute units may each be designated as a priority compute unit. Priority compute units may have access to a shared cache whereas non-priority compute units may not. Workgroups may be preferentially dispatched to priority compute units. Memory access requests from priority compute units may be served ahead of requests from non-priority compute units.

20 Claims, 6 Drawing Sheets

(56) References Cited

U.S. PATENT DOCUMENTS

| | | | | |
|---|---|---|---|---|
| 2009/0031317 | A1* | 1/2009 | Gopalan | G06F 9/5033 |
| | | | | 718/103 |
| 2009/0288092 | A1* | 11/2009 | Yamaoka | G06F 9/5033 |
| | | | | 718/104 |
| 2010/0131955 | A1 | 5/2010 | Brent et al. | |
| 2010/0274879 | A1 | 10/2010 | Wolfe | |
| 2011/0107344 | A1 | 5/2011 | Kim et al. | |
| 2013/0021353 | A1* | 1/2013 | Drebin | G06T 1/60 |
| | | | | 345/522 |
| 2013/0138886 | A1 | 5/2013 | Yamauchi et al. | |
| 2014/0025925 | A1 | 1/2014 | Kondo | |
| 2015/0169382 | A1 | 6/2015 | Anderson et al. | |
| 2015/0347103 | A1* | 12/2015 | Mahaffey | G06F 8/443 |
| | | | | 717/153 |
| 2016/0328272 | A1* | 11/2016 | Ahmed | G06F 9/4881 |
| 2022/0114097 | A1* | 4/2022 | Wang | G06F 12/084 |

OTHER PUBLICATIONS

D. Li et al., "Priority-based cache allocation in throughput processors," 2015 IEEE 21st International Symposium on High Performance Computer Architecture (HPCA), Feb. 7, 2015, pp. 89-100, doi: 10.1109/HPCA.2015.7056024. (Year: 2015).*

Qureshi, Moinuddin K. et al., "Adaptive Insertion Policies for High Performance Caching", ISCA '07, Jun. 9-13, 2007, 11 pgs., San Diego, California, USA.

Lee, Jungseob et al., "Improving Throughput of Power-Constrained GPUs Using Dynamic Voltage/Frequency and Core Scaling", 2011 International Conference on Parallel Architectures and Compilation Techniques (PACT), Oct. 10-14, 2011, pp. 111-120, Galveston Island, Texas, USA.

Wu, Carole-Jean et al., "PACMan: Prefetch-Aware Cache Management for High Performance Caching", MICRO-44 '11, Dec. 3-7, 2011, 12 pgs., Porto Alegre, Brazil.

Mekkat, Veneeth et al., "Managing Shared Last-Level Cache in a Heterogeneous Multicore Processor", In Proceedings of the 22nd international conference on Parallel architectures and compilation techniques (PACT '13), Sep. 7-11, 2013, 10 pgs., Edinburgh, Scotland.

Rogers, Timothy G. et al., "Cache-ConsciousWavefront Scheduling", In Proceedings of the 2012 45th Annual IEEE/ACM International Symposium on Microarchitecture (Micro '12), Dec. 1-5, 2012, 12 pgs., Vancouver, BC, Canada.

Khan, Samira M. et al., "Decoupled Dynamic Cache Segmentation", 2012 IEEE 18th International Symposium on High Performance Computer Architecture (HPCA), Feb. 25-29, 2012, pp. 1-12, New Orleans, Louisiana, USA.

Du, Jianjun, et al., "Management Policies Analysis for Multi-Core Shared Caches." International Conference on Advanced Data Mining and Appliations. Springer Berlin Heidelberg, 2010.

* cited by examiner

SYSTEM PERFORMANCE MANAGEMENT USING PRIORITIZED COMPUTE UNITS

CROSS REFERENCE TO RELATED APPLICATION

This application claims priority to a utility application U.S. patent application Ser. No. 14/755,401, filed Jun. 30, 2015, which is incorporated by reference as if fully set forth.

TECHNICAL FIELD

The disclosed embodiments are generally directed to processing devices, and in particular, to a processing device having multiple compute units.

BACKGROUND

Various computer processors, such as graphics processing units (GPUs), may include multiple compute units (CUs). A CU may include, for example, one or more single instruction multiple data (SIMD) processing cores. Each compute unit may execute an instantiation of a particular work-item to process incoming data. A work-item may be one of a collection of parallel executions of a kernel invoked on the device by a command. A work-item may be executed by one or more processing elements as part of a work-group executing on a CU. In some implementations, a CU may include a private memory or private cache, which is accessible to only that CU. A CU may also have access to a shared memory and/or shared cache.

The throughput of some types of applications may scale with the number of compute units. GPU applications, for example, are typically memory intensive and often generate a large number of memory requests. Installing these memory requests in a shared cache, such as a lowest level cache (LLC) may cause cache thrashing behavior, which increases the LLC miss rate. Accordingly, the throughput of GPU applications may not scale linearly with the number of compute units.

SUMMARY OF EMBODIMENTS

Some embodiments provide a method for managing performance of a processor having multiple CUs. An effective number of the multiple compute units is determined to designate as having priority. On a condition that the effective number is nonzero, the effective number of the multiple CUs are each designated as a priority CU.

Some embodiments provide a processor comprising multiple CUs. The processor comprises circuitry configured to determine an effective number of the multiple CUs to designate as having priority. The processor comprises circuitry configured to, on a condition that the effective number is nonzero, designate the effective number of the compute units each as a priority compute unit.

Some embodiments provide a system for managing performance of a processor having multiple CUs. The system comprises a processor and a memory. The processor comprises multiple CUs, circuitry configured to determine an effective number of the multiple CUs to designate as having priority, and circuitry configured to, on a condition that the effective number is nonzero, designate the effective number of the CUs each as a priority CU. The memory is accessible to the CUs.

BRIEF DESCRIPTION OF THE DRAWINGS

A more detailed understanding may be had from the following description, given by way of example in conjunction with the accompanying drawings wherein.

DETAILED DESCRIPTION

Figure 1:
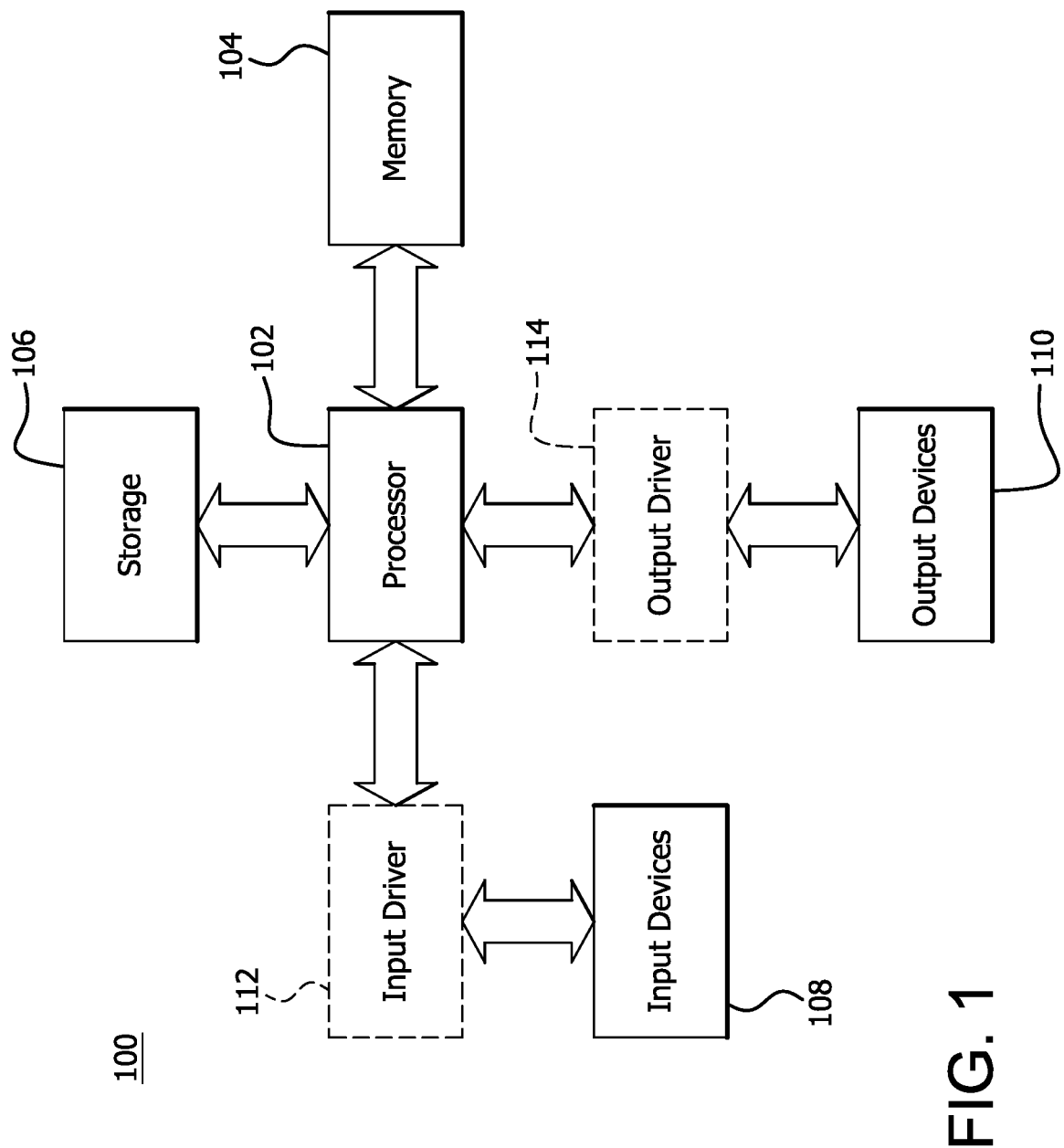
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

In general, a processing device such as a GPU may include one or more CUs. A CU may include, for example, one or more single instruction multiple data (SIMD) processing cores. Each compute unit may execute an instantiation of a particular work-item to process incoming data. A work-item may be one of a collection of parallel executions of a kernel invoked on the device by a command. A work-item may be executed by one or more processing elements as part of a work-group executing on a CU. In some implementations, a CU may include a private memory or private cache, which is accessible to only that CU. A CU may also have access to a shared memory and/or shared cache.

Various processing devices, including certain GPUs and other processors with parallel architectures, may include a plurality of CUs, some or all of which may run concurrently. Under certain circumstances, some applications which run on such processing devices may benefit from increased throughput by executing threads concurrently on multiple CUs. In some implementations, all or a subset of the CUs may access shared resources. For example, the CUs may access a common main memory and/or one or more levels of common cache memory in order to load and/or store data.

During concurrent operation, the CUs may compete for access to these common resources, potentially causing a bottleneck. If 8 CUs share a shared lowest level cache (LLC) and all CUs try to allocate the LLC for example, frequent cache misses and a high level of thrash may result when running certain applications. Such applications may include memory intensive applications requiring a relatively high number of memory accesses. Other applications however, such as those requiring a relatively fewer number of memory accesses, may not suffer the same number cache misses or the same amount of thrashing.

Considered in another way, the throughput of some applications executing on a multi-CU processor may scale with the number of CUs, while the throughput of other applications may not scale. Whether or not application throughput scales with the number of CUs may relate to the memory access rate of the applications. For example, if a certain application executes a high number of load and store instructions in a given time period which result in cache evictions, throughput may not scale with the number of CUs. In such cases, the bandwidth of the cache and/or main memory may limit throughput.

One possible approach for increasing multi-CU processor performance under such circumstances may be to allow only a subset of the CUs to install memory requests into the shared cache. In this scenario, memory requests from prioritized CUs may be allocated in the shared cache, while memory requests from non-prioritized CUs bypass the shared cache (i.e. are not allocated). For example, a load instruction from a prioritized cache which results in a cache miss may cause the shared cache to load the data from main memory, potentially evicting a cache line to do so. A load instruction from a non-prioritized CU which results in a cache miss will be serviced from main memory, but will not be allocated into the shared cache and will not result in a cache eviction or contribute to thrash in the shared cache.

Another possible approach for increasing multi-CU processor performance under such circumstances may be to allow prioritized CUs to have prioritized access to main memory. For example, where prioritized and non-prioritized CUs execute instructions which would require concurrent access of the main memory, the prioritized CU requests would be inserted into the input read/write queue ahead of requests from the non-prioritized CUs. This may be advantageous where the prioritized CUs have exclusive access to a shared cache because the increased cache hit rate of the prioritized CUs may be bottlenecked on main memory access latency. By prioritizing the main memory access of these CUs and maximizing their throughput, overall performance may be increased.

Exclusive access to shared cache allocation and/or higher priority memory access as discussed above may result in the prioritized CUs running faster than the non-prioritized CUs. In order to realize a potential benefit of this speed advantage, the workgroup dispatching policy may be modified to prioritize dispatch to the prioritized CUs. Thus, where one or more CUs have available execution slots, workgroups may be assigned to prioritized CUs for execution if available. This may have the advantage of increasing throughput in cases where there are fewer workgroups than the total execution slots available on the CUs, for example.

In order to leverage these approaches, it may be necessary to determine an effective or optimum number of prioritized CUs. This determination may be made dynamically using various techniques, such as by using a set-dueling monitor (SDM) or a decision tree-based set-dueling technique as discussed further herein. Such techniques may accumulate statistics, such as cache miss rates for example, and may use such statistics to predict the best number of CUs to designate as prioritized for a given application and during a given time period.

It is noted that the techniques discussed herein are not limited to the CU granularity, but may also be extended to managing the execution of individual wavefronts or workgroups granularity.

Figure 2:
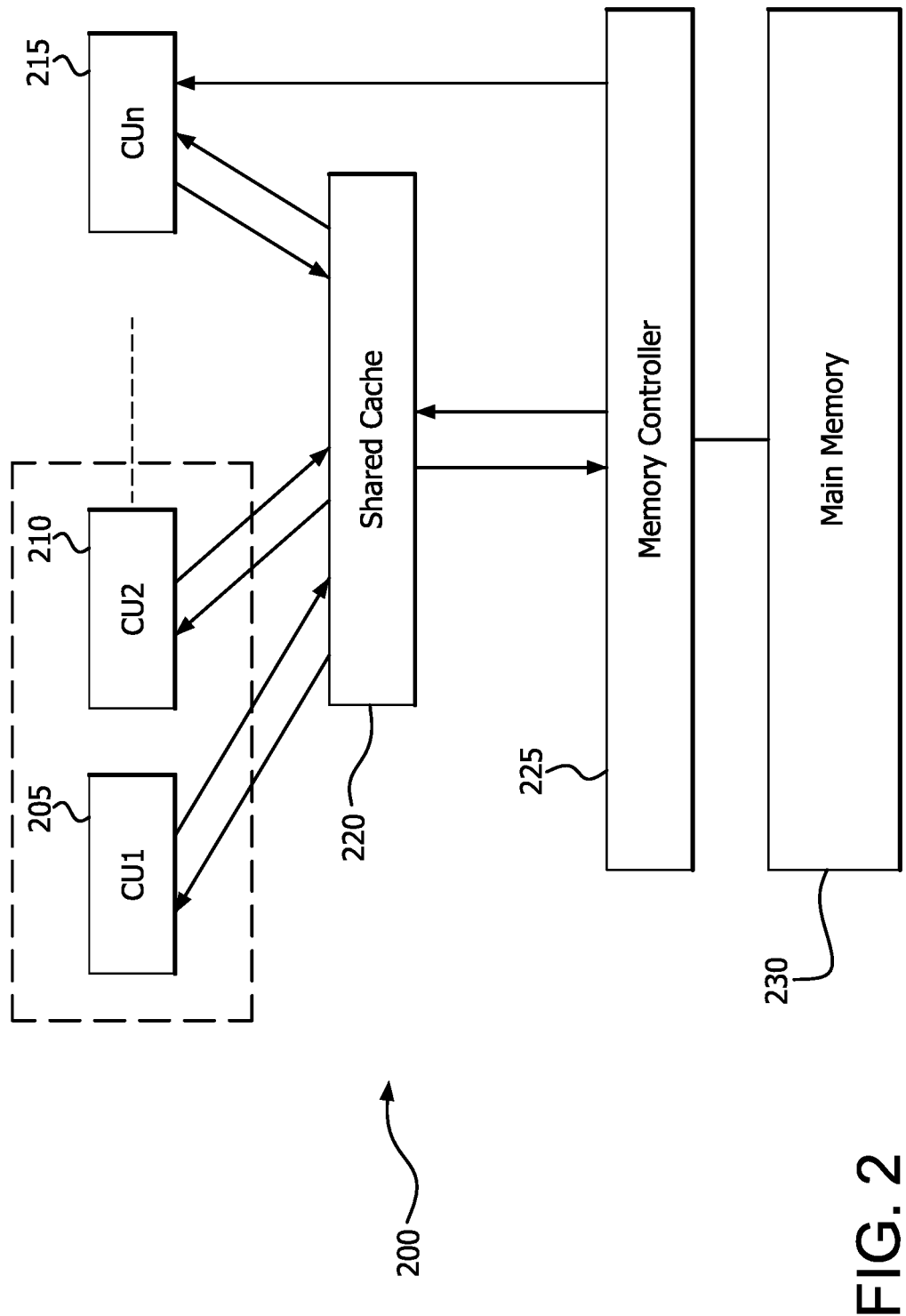
FIG. 2 is a block diagram showing an example system illustrating CU prioritization for shared cache access.

FIG. 2 is a block diagram showing an example system 200 which illustrates aspects of CU prioritization for shared cache access. System 200 may be implemented as a part of system 100 (FIG. 1). In one example implementation, system 200 may be implemented on, or partly on, processor 102.

System 200 includes CU1 205, CU2 210, CUn 215, a shared cache 220, memory controller 225, and main memory 230. It is noted that CUn 215 may be representative of a number of non-prioritized CUs (not shown). It is also noted that shared cache 220 may be an LLC for example, however the concepts discussed herein may be generalizable to shared caches at other levels in a cache hierarchy, or to other types of shared storage. It is further noted that main memory 230 may be a dynamic random access memory (DRAM) or any other suitable storage device, and that in some implementations the concepts described with respect to memory controller 225 and main memory 230 may be generalizable to storage other than main memory, such as a cache or a backing store.

In this example, CU1 205 and CU2 210 are designated as prioritized, and CUn 215 is designated as non-prioritized. Prioritized CU1 205 and CU2 210 may access and allocate the shared cache 220 during operation. For example, CU1 205 may access shared cache 220 when executing a load instruction to determine if data from a desired address within main memory 230, (specified in the load instruction) is resident in shared cache 220. If the data is resident in the shared cache 220 (i.e. on a cache hit), CU1 205 loads the data from the cache. If the data from the desired address is not resident in the shared cache 220 (i.e. on a cache miss), shared cache 220 installs the data from the desired address of main memory 230 into an allocated cache line in the shared cache 220 via the memory controller 225, and CU1 205 may then load the data from shared cache 220.

Non-prioritized CUn 215, in contrast, may access shared cache 220, but may not allocate shared cache 220 during operation. For example, CUn 215 may access shared cache 220 when executing a load instruction to determine if data from a desired address within main memory 230, (specified in the load instruction) is resident in shared cache 220. On a cache hit, CUn 215 may load the data from the cache. On a cache miss however, CUn 215 loads the data from the desired address of main memory 230 via memory controller 225, bypassing shared cache 220. It is noted that this may not preclude CUn 215 from writing the data to a private local cache.

It is noted that prioritized CU1 205 and CU2 210 as well as non-prioritized CUn 215 may access shared cache 220 on a store instruction to write data to the main memory 230. Such data may be written to shared cache 220, and may later be written back to the main memory 230 via memory controller 225. Both prioritized and non-prioritized CUs may access the shared cache 220 in this way to maintain cache coherency. However non-prioritized CUn 215 may only write to the shared cache 220 where the respective cache block has already been allocated. Prioritized CU1 205 and CU2 210 may write to the shared cache 220 where the respective cache block has already been allocated and may also allocate a cache block and write to the newly allocated cache block.

The configuration of FIG. 2 may increase throughput for certain applications, under certain circumstances. For example, an application may realize an increase in throughput from executing threads on multiple CUs (e.g. CU1 205, CU2 210, CUn 215) due to parallelism. However, if the application executes a large number of memory access operations, the competition among these CUs for the shared cache 220 may increase the cache miss rate and cause shared cache 220 to thrash. The increased miss rate and thrash may increase the latency of shared cache 220, decreasing overall throughput of system 200. In such circumstances, thrash may be reduced by preventing CUn 215 from allocating shared cache 220. This may increase throughput of system 200 by reducing the latency of shared cache 220.

Whether to designate certain CUs as prioritized and other CUs as non-prioritized, or the number of CUs to designate as prioritized and non-prioritized may depend upon the specific application in question, and/or the particular circumstances or execution phase of the application. For example, certain applications or phases of operation of such applications may be relatively memory intensive, and may thus cause contention among the CUs for allocation of the shared cache (and may cause cache misses and thrash). In such cases, it may be more advantageous to designate fewer CUs as prioritized CUs, in order to maintain the memory access latency benefits of the cache, for example, by better matching the size of the cache to the smaller working set of fewer CUs. Other applications or phases of operation of such applications may be relatively less memory intensive. In such cases, it may be more advantageous to designate a greater proportion (or all) of the CUs as prioritized, in order to reduce the cache latency and maintain overall memory access latency at acceptable levels. This may be possible due to a relatively lower cache footprint demand of multiple CUs.

A prediction mechanism may be used to dynamically determine the number of CUs to designate as prioritized versus non-prioritized. The predictor may experimentally determine a number of CUs to designate as prioritized by estimating the miss penalty for various numbers of prioritized CUs. The predictor may compare a sample of cache sets, each considering a different number of candidate CUs as prioritized.

In one possible implementation, the predictor may assign a relatively small group of sets of shared cache 220 to one of the competing prioritization policies (e.g. numbers of prioritized CUs) for a particular period of time and may accumulate statistics for each set. Here the term set refers to a cache set as is commonly known in the art, and may be described as a grouping of cache lines. For example, in a 2-way set associative cache, a cache having 128 lines may be described as having 64 sets with 2 ways of associativity. It is noted that in a fully associative cache (i.e. having no sets), or in other desired implementations, any suitable subsets of lines may be chosen in lieu of sets, to assign to the competing prioritization policies. The predictor may then compare the statistics to determine the winner (i.e. best prioritization policy). If any other potential policies remain unexamined, the winner may be used to determine which of the remaining policies should be compared in a subsequent round.

It is noted that a predictor or other suitable mechanism for determining and designating the number of CUs as prioritized versus non-prioritized may operate and/or be employed continuously, at a particular time, during execution of certain applications or application execution phases, any combination of these, or at any suitable time or range of times. For example, the number of CUs may be dynamically designated continuously during the operation of system 200. In another example, the number of CUs may be dynamically designated only during execution of certain applications, and may be statically designated during execution of other programs. This static designation may be preset (e.g. all CUs designated as prioritized) or may be determined by the predictor. In another example, the number of CUs to designate as prioritized may be determined by the predictor over varying time scales. For example, the number of prioritized CUs may be updated at a first rate (e.g. more frequently) for a certain application and at a second rate (e.g. less frequently) for a different application. Various permutations of the foregoing will be evident to those having skill in the art.

Figure 3:
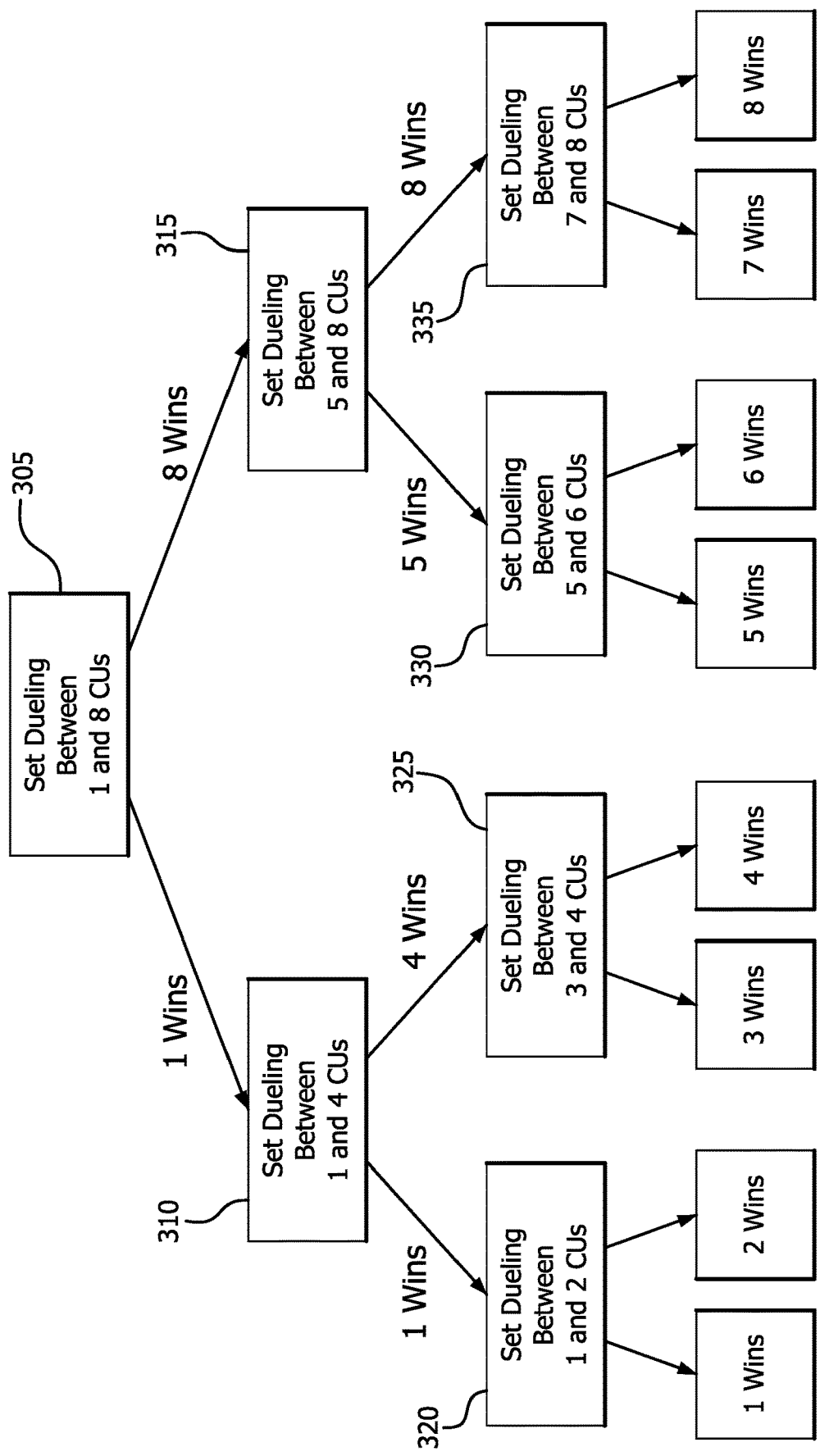
FIG. 3 is a tree diagram illustrating an example operation of a predictor.

FIG. 3 is a tree diagram illustrating an example operation of such predictor for a shared cache and a field of 8 CUs. It is noted that a predictor may be designed in a similar way for shared caches having an arbitrary number of ways and/or sets, and an arbitrary number of CUs.

In step 305 the predictor designates 1 CU as prioritized for 32 cache sets of the cache, and designates 8 CUs as prioritized for 32 different cache sets of the cache. Thus only 1 CU (designated as prioritized) is permitted to allocate to the first 32 cache sets, and 8 CUs (designated as prioritized) are permitted to allocate to the other 32 cache sets. The predictor then accumulates statistics (such as cache miss rates) for each group of cache sets for a sample period. This sample period may be of a duration sufficient to determine to a desired degree of statistical confidence whether designating 1 CU or 8 CUs as prioritized (i.e. which prioritization policy) will provide greater throughput during a subsequent time period. This time period may be predetermined, and may be measured as a certain number of memory instructions or cycles, as a certain amount of elapsed time, or any other suitable measure. The sample period may also be varied or optimized for different applications and/or phases of execution as desired. This comparison may be referred to as a first round experiment. After a sample period has elapsed, these statistics are compared to determine whether designation of 1 CU or 8 CUs as prioritized results in higher performance (better cache miss rates in this example) for the application that is executing during the sample period. The policy which results in the highest performance based on the comparison may be referred to as the winner.

After step 305 completes, a number of prioritization policies remain to be examined before the best policy can be determined for the executing application. Accordingly, the winner of step 305 is used to determine whether the predictor should compare designation of 1 CU with 4 CUs in step 310, or to compare designation of 5 CUs with 8 CUs in step 315 in a second comparison, which may be referred to as a second round experiment. In either case, the predictor then accumulates statistics (such as cache miss rates) for each group of sets in the second round experiment. After a sample period has elapsed, these statistics are compared to determine which number of prioritized CUs results in higher performance for the application that is executing during the sample period.

After either step 310 or 315 completes, a number of prioritization policies remain to be examined before the best policy can be determined for the executing application. Accordingly, the winner of step 310 or 315 is used to determine whether the predictor should compare designation of 1 CU with 2 CUs in step 320, to compare designation of 3 CUs with 4 CUs in step 325, to compare designation of 5 CU with 6 CUs in step 330, or to compare designation of 7 CUs with 8 CUs in step 335 in third comparison, which may be referred to as a third round experiment. In any of these cases, the predictor then accumulates statistics (such as cache miss rates) for each group of cache sets in the third round experiment. After a sample period has elapsed, these statistics are compared to determine which number of prioritized CUs results in higher performance for the application that is executing during the sample period.

After step 320, 325, 330, or 335 completes, no prioritization policies remain to be examined. Accordingly, the best policy may be determined to be the winner of the third round experiment, and this number of CUs may be designated as prioritized for execution of the current application for a desired period of time. After the desired period of time has elapsed, the predictor may be employed once again to reevaluate the best CU prioritization policy. In this way, the prioritization policy may be dynamically adjusted to track changes in the memory access behavior of the application or a change to execution of a different application, for example.

Figure 4A:
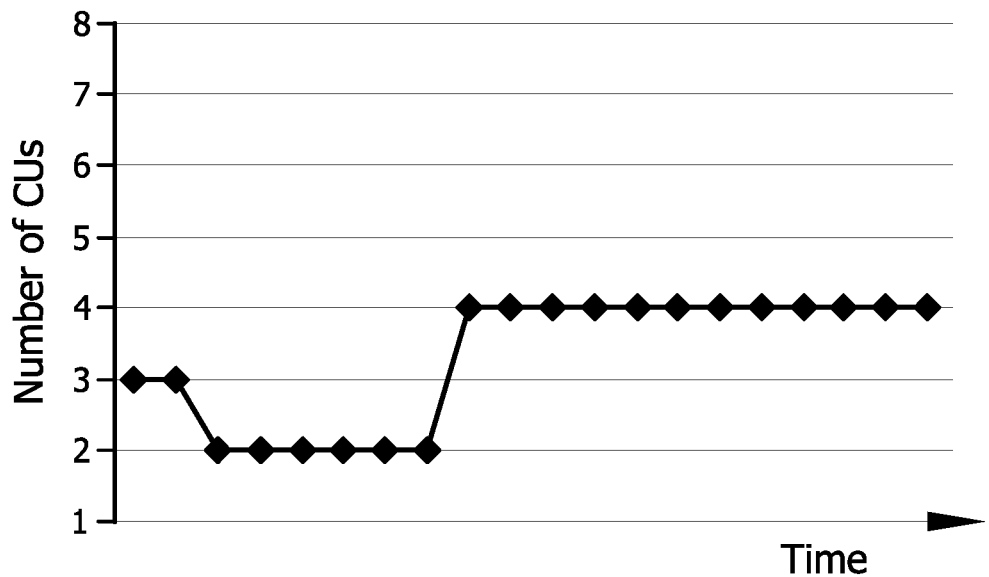
FIGS. 4A and 4B illustrate example outputs of the predictor described with respect to FIG. 3.
Figure 4B:
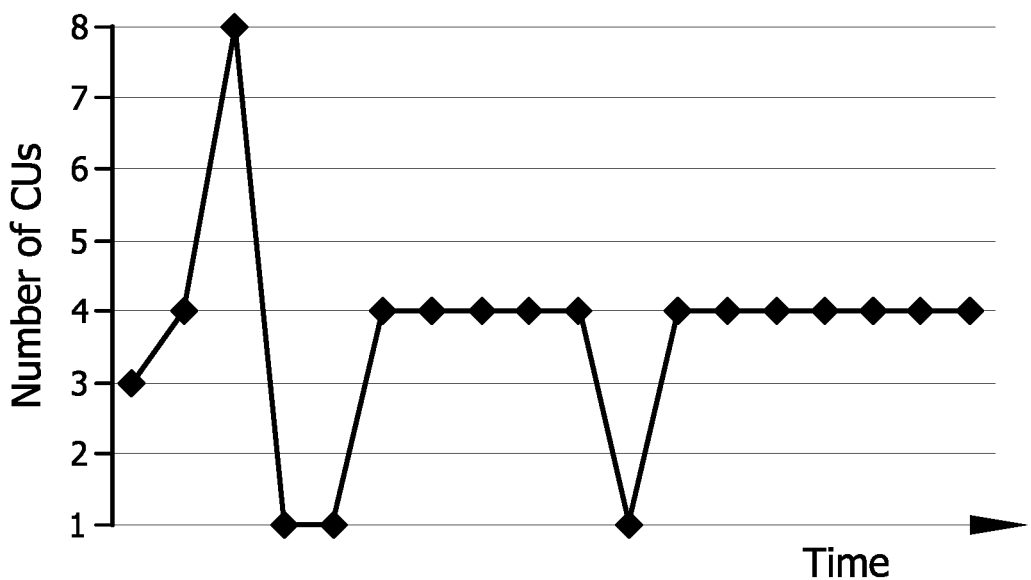

FIGS. 4A and 4B illustrate example outputs of such a predictor for two benchmark applications A and B. These figures reflect the change in best CU prioritization policy over time as the memory access behavior of the application running on the CUs changes. In this example, the time scale reflects the number of prioritized CUs for each sample period.

Figure 5:
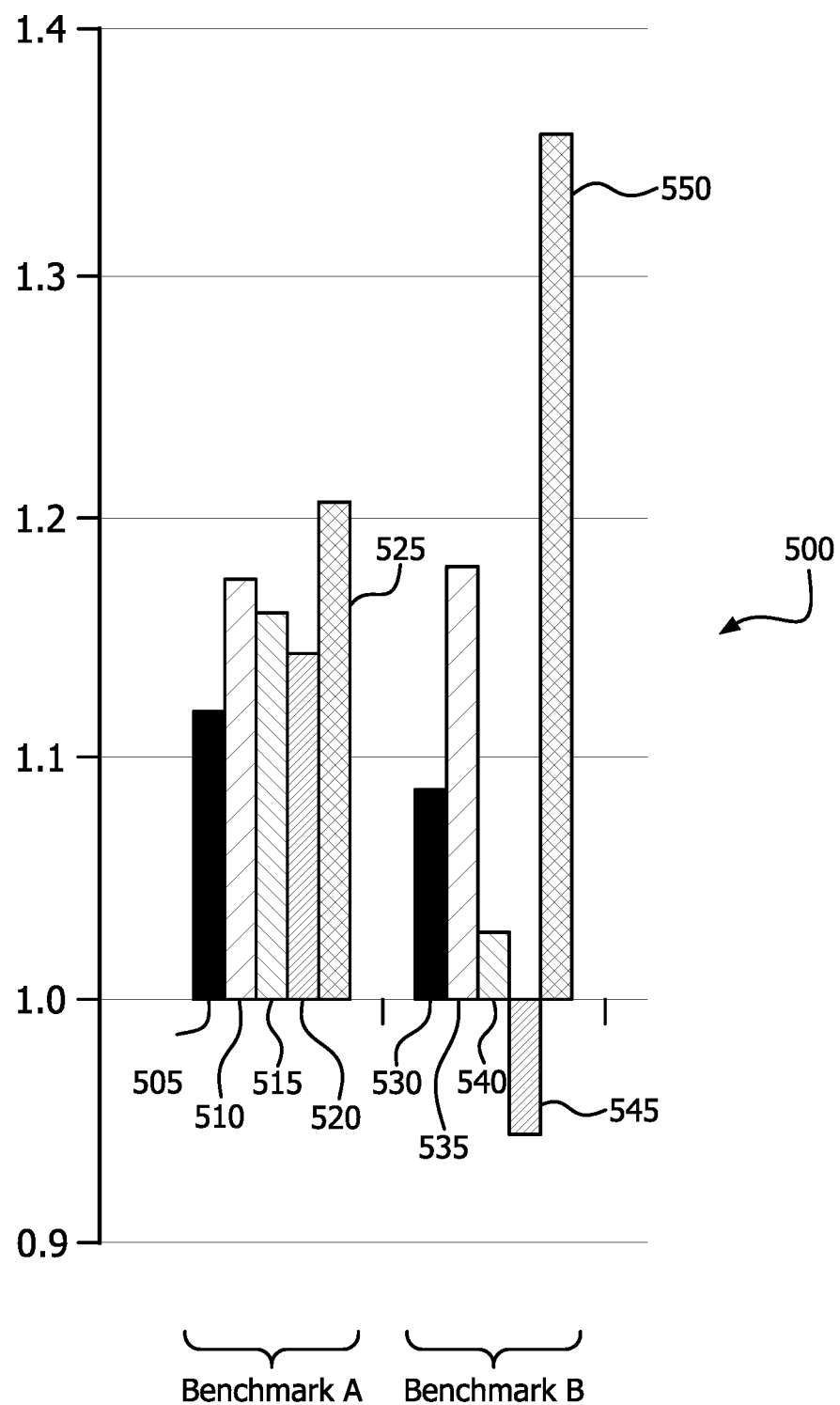
FIG. 5 is a bar chart illustrating relative performance of dynamic designation of CUs as prioritized.

FIG. 5 is a bar chart 500 illustrating the relative throughput of dynamic designation of CUs as prioritized versus static designation (i.e., designation of a fixed number of CUs as prioritized). The baseline in chart 500 reflects all 8 CUs as prioritized (i.e., all can allocate the cache, all have equal access to main memory, and/or all have equal weighting in workgroup assignments). The vertical scale reflects "speedup" where speedup=(runtime of the baseline)/(runtime of the enhancement) in this case. For benchmark A, bars 505, 510, 515, and 520 reflect the speedup for static designation of 1, 2, 4, and 6 CUs as prioritized respectively, and 525 reflects the speedup of dynamic designation of the number of prioritized CUs. For benchmark B, bars 530, 535, 540, and 545 reflect the speedup for static designation of 1, 2, 4, and 6 CUs as prioritized respectively, and 550 reflects the speedup of dynamic designation of the number of prioritized CUs.

These example measurements demonstrate that for these example benchmarks, the effective number of prioritized CUs is in fact less than the maximum (8 in this example) during the relevant time period, and that the best performance during the relevant time period was achieved by dynamic determination of the number of prioritized CUs. It is noted that this result may vary for different benchmarks. It is further noted that these measurements are strictly exemplary, and that measurements (including relative measurements) of these metrics may vary depending on the specific implementation, applications, loading, memory access intensity, and so forth as will be understood by those having skill in the art.

Figure 6:
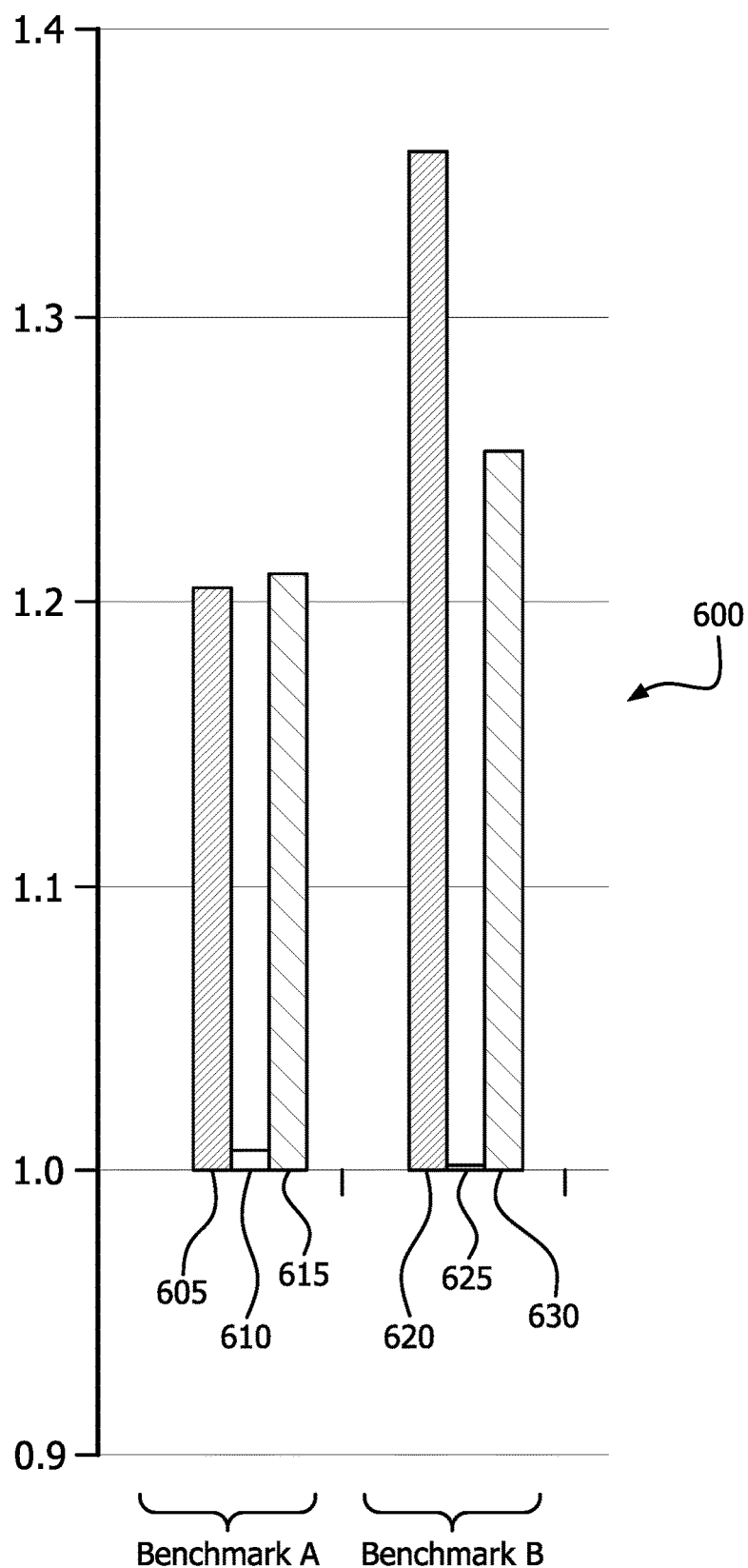
FIG. 6 is a bar chart illustrating relative performance of dynamic determination of CUs as prioritized in combination with memory access prioritization.

FIG. 6 is a bar chart 600 illustrating the speedup of benchmarks A and B using dynamic determination of the number of prioritized CUs and prioritized access to main memory. The baseline in chart 600 reflects all 8 CUs as prioritized (i.e., all can allocate the cache, all have equal access to main memory, and/or all have equal weighting in workgroup assignments).

For benchmark A over a given time period, bar 605 reflects the speedup for dynamic determination of the number of prioritized CUs combined with prioritized access to main memory. Bar 610 reflects the speedup of benchmark A for dynamic determination of the number of prioritized CUs without prioritized access to main memory. Bar 615 reflects the speedup of benchmark A for prioritized access to main memory without dynamic determination of the number of prioritized CUs.

For benchmark B over a given time period, bar 620 reflects the speedup for dynamic determination of the number of prioritized CUs combined with prioritized access to main memory. Bar 625 reflects the speedup of benchmark A for dynamic determination of the number of prioritized CUs without prioritized access to main memory. Bar 630 reflects the speedup of benchmark A for prioritized access to main memory without dynamic determination of the number of prioritized CUs.

The speedup measures shown in FIG. 6 illustrate that the speedup of dynamic determination of the number of prioritized CUs and prioritized access to main memory may be codependent, cumulative, and/or complementary. For example, in both benchmark A and benchmark B most of the speedup of dynamic allocation over static allocation of 8 CUs as prioritized is lost without memory prioritization. For benchmark B, the speedup is not as great for memory prioritization without dynamic allocation of prioritized CUs as it is for both memory prioritization with dynamic allocation of prioritized CUs. It is noted that these measurements are strictly exemplary, and that measurements (including relative measurements) of these metrics may vary depending on the specific implementation, applications, loading, memory access intensity, and so forth as will be understood by those having skill in the art.

It is noted that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for managing performance of a processor when an application is executed, the method comprising:
   determining a number of multiple compute units of the processor to have priority for the application based on accumulated statistics for the application, wherein each of the multiple compute units includes one or more single instruction multiple data (SIMD) processing cores;
   designating the determined number of the multiple compute units each as a priority compute unit that accesses memory prior to non-designated compute units among the multiple compute units; and
   executing the application using the one or more SIMD processing cores of each priority compute unit designated.

2. The method of claim 1, further comprising allowing each priority compute unit to allocate into a shared cache.

3. The method of claim 1, further comprising disallowing a compute unit which is not a priority compute unit to allocate into a shared cache.

4. The method of claim 1, further comprising prioritizing access to a memory by a priority compute unit over a compute unit which is not a priority compute unit.

5. The method of claim 1, further comprising serving a pending request for access to a memory by a priority compute unit prior to serving any pending request for access to the memory by a compute unit which is not a priority compute unit.

6. The method of claim 1, wherein the determining comprises set dueling.

7. The method of claim 1, further comprising dispatching a workgroup to a priority compute unit prior to dispatching the workgroup to a compute unit which is not a priority compute unit.

8. The method of claim 1, wherein the accumulated statistics are for a particular phase of the application.

9. A processor comprising:
   multiple compute units, wherein each of the multiple compute units includes one or more single instruction multiple data (SIMD) processing cores;
   circuitry configured to determine a number of the multiple compute units to designate as having priority for an application based on accumulated statistics for the application;
   circuitry configured to designate the number of the compute units each as a priority compute unit that accesses memory prior to non-designated compute units among the multiple compute units; and
   circuitry configured to execute the application using the one or more SIMD processing cores of each priority compute unit designated.

10. The processor of claim 9, further comprising circuitry configured to allow each priority compute unit to allocate into a shared cache.

11. The processor of claim 9, further comprising circuitry configured to disallow a compute unit which is not a priority compute unit to allocate into a shared cache.

12. The processor of claim 9, further comprising circuitry configured to prioritize access to a memory by a priority compute unit over access to the memory by a compute unit which is not a priority compute unit.

13. The processor of claim 9, further comprising circuitry configured to serve a pending request for access to a memory by a priority compute unit prior to serving any pending request for access to the memory by a compute unit which is not a priority compute unit.

14. The processor of claim 9, wherein the circuitry is configured to determine the number based on set dueling.

15. The processor of claim 9, further comprising circuitry configured to dispatch a workgroup to a priority compute unit prior to dispatching the workgroup to a compute unit which is not a priority compute unit.

16. The processor of claim 9, wherein the accumulated statistics are for a particular phase of the application.

17. A system for managing performance of a processor having multiple compute units, the system comprising:
   circuitry configured to determine a number of the multiple compute units to designate as having priority for an application based on accumulated statistics for the application, wherein each of the multiple compute units includes one or more single instruction multiple data (SIMD) processing cores, and
   circuitry configured to designate the number of the compute units each as a priority compute unit that accesses memory prior to non-designated compute units among the multiple compute units;
   circuitry configured to execute the application using the one or more SIMD processing cores of each priority compute unit designated; and
   a memory accessible to the multiple compute units.

18. The system of claim 17, wherein the processor further comprises circuitry configured to allow each priority compute unit to allocate into a shared cache and circuitry configured to disallow a compute unit which is not a priority compute unit to allocate into the shared cache.

19. The system of claim 17, wherein the processor further comprises circuitry configured to prioritize access to the memory by a compute unit over access to the memory by a compute unit which is not a priority compute unit.

20. The system of claim 17, further comprising circuitry configured to dynamically determine the number by performing set dueling.

* * * * *